(12) United States Patent
Lickfelt et al.

(10) Patent No.: US 7,916,021 B2
(45) Date of Patent: Mar. 29, 2011

(54) SMART ENTRY SYSTEM AND METHOD

(75) Inventors: Brian K. Lickfelt, Powell, OH (US); Jason D. DiSalvo, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 12/191,143

(22) Filed: Aug. 13, 2008

(65) Prior Publication Data

US 2010/0039221 A1    Feb. 18, 2010

(51) Int. Cl.
 *G08B 13/14* (2006.01)
(52) U.S. Cl. .................. 340/571; 340/426.13; 340/5.61
(58) Field of Classification Search .................. 340/571, 340/5.72, 5.61, 430, 426.13, 426.17, 545.1, 340/539.23

See application file for complete search history.

(56) References Cited

U.S. PATENT DOCUMENTS

| | | | |
|---|---|---|---|
| 5,600,323 A | 2/1997 | Boschini | |
| 6,236,333 B1 | 5/2001 | King | |
| 6,281,599 B1 | 8/2001 | Murakami et al. | |
| 6,522,027 B1 | 2/2003 | Morillon et al. | |
| 6,542,071 B1 | 4/2003 | Ohtsubo et al. | |
| 6,831,547 B2 * | 12/2004 | Watarai et al. | 340/5.61 |
| 6,944,528 B2 | 9/2005 | Nagano | |
| 6,998,958 B2 | 2/2006 | Asakura et al. | |
| 6,998,967 B2 * | 2/2006 | Brillon et al. | 340/426.13 |
| 7,049,940 B2 * | 5/2006 | Ieda et al. | 340/5.61 |
| 7,190,253 B2 | 3/2007 | Shimomura | |
| 7,202,772 B2 * | 4/2007 | Emmerling et al. | 340/5.72 |
| 7,292,134 B2 | 11/2007 | Conner et al. | |
| 2005/0099263 A1 | 5/2005 | Ikeda | |
| 2006/0170241 A1 | 8/2006 | Yamashita | |
| 2006/0197677 A1 | 9/2006 | Watanabe et al. | |
| 2007/0057765 A1 | 3/2007 | Ogino et al. | |
| 2007/0162191 A1 | 7/2007 | Matsubara et al. | |
| 2007/0197194 A1 | 8/2007 | Oyagi et al. | |
| 2007/0205863 A1 | 9/2007 | Eberhard | |
| 2008/0027589 A1 | 1/2008 | Hiwano et al. | |

FOREIGN PATENT DOCUMENTS

DE   102006042682   5/2007
EP   1228931        8/2002

OTHER PUBLICATIONS

European Search Report dated Nov. 17, 2009.

* cited by examiner

*Primary Examiner* — John A Tweel, Jr.
(74) *Attorney, Agent, or Firm* — Rankin Hill & Clark LLP (57) ABSTRACT

A smart entry system and method includes at least one actuating device for operation of at least two vehicle functions, an on-board transmitter for sending request signals to a portable device, and an on-board receiver for receiving an identification signal from the portable device. The on-board transmitter sends a first request signal within a first search field when the at least one actuating device is subjected to a first actuating operation for initiating a first vehicle function. A second request signal is sent within a second search field when the at least one actuating device is subjected to a second actuating operation for initiating a second vehicle function. The first search field varies relative to the second search field.

19 Claims, 5 Drawing Sheets

SMART ENTRY SYSTEM AND METHOD

BACKGROUND

The present disclosure relates to a smart entry system and method for a vehicle, and particularly relates to a smart entry system and method that provides a dynamic search area corresponding to a selected smart entry function.

Smart entry systems are currently used by many vehicle manufacturers. Heretofore, however, smart entry has been routinely applied to four-door sedans, and sometimes two-door coupes, but rarely to sport utility vehicles and the like, particularly those employing a powered tailgate.

Smart entry systems only require that a user have a key fob to access the vehicle if it is locked. The user need not perform any physical operation on the key fob (e.g., pushing of a button), but can leave the fob in a pocket, purse, etc. In operation, the vehicle will detect the presence of the fob based on sensors and/or switches. When triggered, the vehicle will send a low frequency (LF) search field. Within the search field, the vehicle looks for or searches for the key fob (e.g., sends out a request signal). If found, the key fob will reply to the request signal or search field via RF communications. For example, the key fob will send back a unique identifier confirming that it is properly associated with the vehicle.

A problem can occur when existing smart entry systems are employed in conjunction with certain vehicle closures, such as powered tailgates, for example. In particular, it is common to limit the range of the search field for minimizing any security risks associated with the smart entry system. However, in the example of a powered tailgate, the operator typically must move back relative to a rear edge of the vehicle for closing the tailgate and/or operating a close/lock switch or actuator. Moving back can undesirably remove the operator and the fob carried by the operator from the search field. This results in competing considerations: if power is constant and low, security will be enhanced, but the system will not have enough range to reach the fob when the powered tailgate is open; in contrast, if power is constant and high, security will not be as good, but the range will be suitable for finding the key fob.

SUMMARY

According to one aspect, a smart entry system for a vehicle is provided. More particularly, in accordance with this aspect, the smart entry system includes at least one actuating device for operation of at least two vehicle functions, an on-board transmitter for sending request signals to a portable device, and an on-board receiver for receiving an identification signal from the portable device. The on-board transmitter sends a first request signal within a first search field when the at least one actuating device is subjected to a first actuating operation for initiating a first vehicle function and sends a second request signal within a second search field when the at least one actuating device is subjected to a second actuating operation for initiating a second vehicle function. The first search field varies relative to the second search field (e.g., the size and/or location of the search field can vary relative to the size and/or location of the second search field).

According to another aspect, a smart entry method for a vehicle is provided. More particularly, in accordance with this aspect, a first request signal is sent within a first search field when a first actuating operation occurs. An identification signal is received within a first prescribed time after sending the first request signal from a portable device located within the first search field. A first vehicle function is actuated upon receipt of the identification signal within the first prescribed time. A second request signal is sent within a second, larger search field when a second actuating operation occurs. A second identification signal is received from the portable device located within the second search field within a second prescribed time after sending the second request signal. A second vehicle function is actuated upon receipt of the second identification signal within the second prescribed time.

According to still another aspect, a smart entry method for a vehicle is provided. More particularly, in accordance with this aspect, a first actuation signal is received indicating that a first actuating operation is occurring. A first request signal is transmitted within a first search field upon receipt of the first actuation signal. An identification signal is received from a portable device located within the first search field within a first prescribed time after sending the first request signal. A first vehicle function command signal is sent after receiving the identification signal within the first prescribed time. A second actuation signal is received indicating that a second actuation operation is occurring. A second request signal is transmitted within a second search field upon receipt of the second actuation signal. Another identification signal is received from the portable device located within the second search field within a second prescribed time after sending the second request signal. A second vehicle function command signal is sent after receiving said another identification signal located within the second search field.

DETAILED DESCRIPTION

Figure 1:
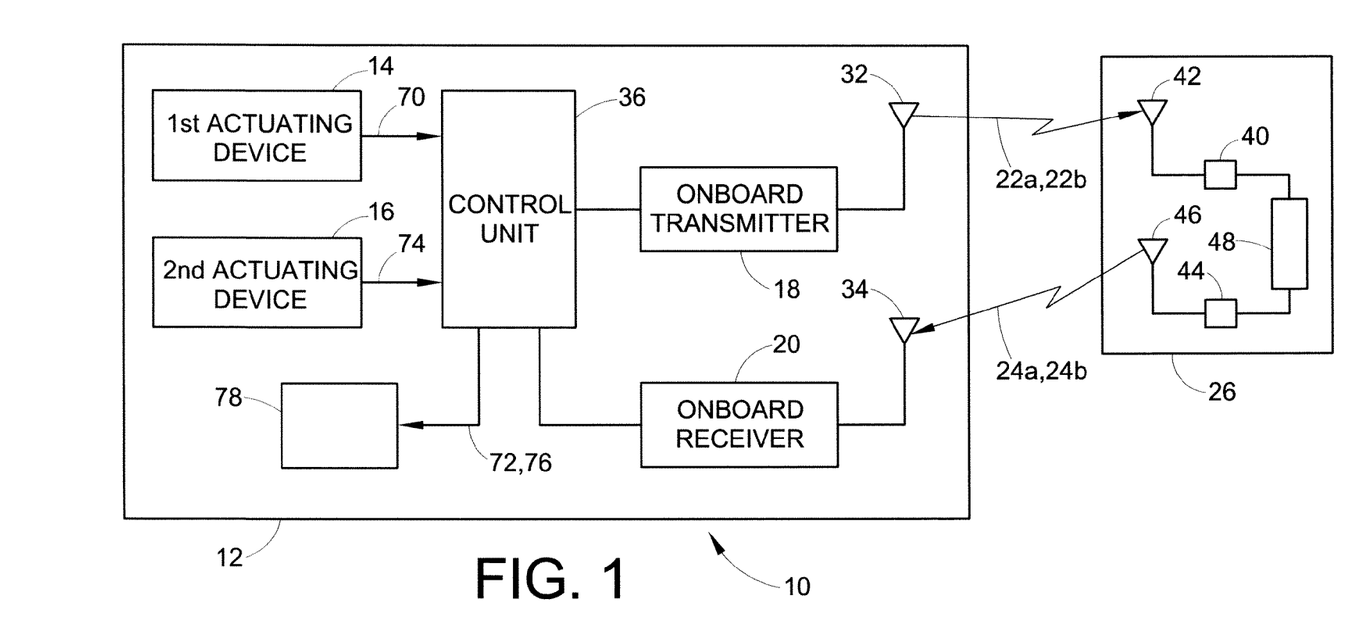
FIG. 1 is a schematic diagram showing an exemplary smart entry system.

Referring now to the drawings, wherein the showings are for purposes of illustrating one or more exemplary embodiments, FIG. 1 schematically illustrates a smart entry system 10 for a vehicle 12. As shown, the smart entry system 10 can include at least one actuating device (e.g., first actuating device 14 and second actuating device 16) for operation of at least two vehicle functions, an onboard transmitter 18, and an onboard receiver 20. As will be described in more detail below, the onboard transmitter 18 is for sending request signals 22a, 22b to a portable device, such as portable device 26, and the onboard receiver 20 is for receiving identification (ID) signals 24a,24b from the same portable device (e.g., portable device 26).

Figure 2:
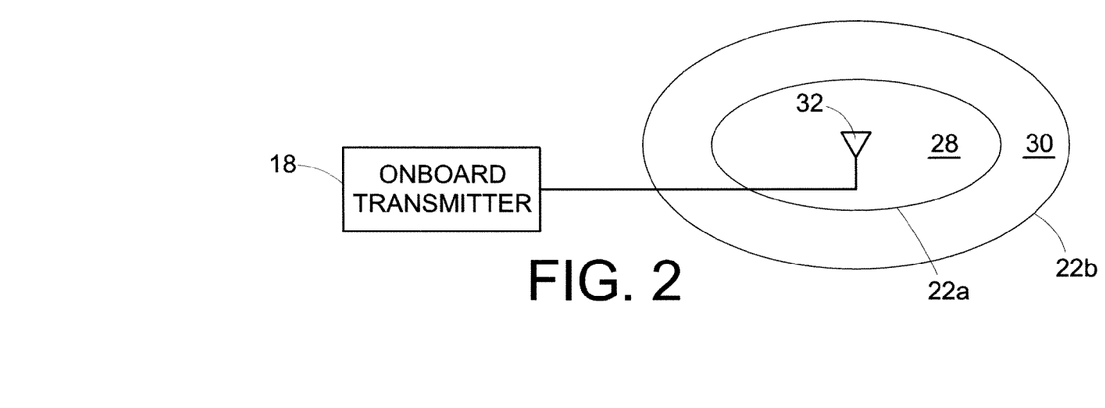
FIG. 2 is a schematic diagram of an on-board transmitter of the smart entry system of FIG. 1 transmitting a first request signal within a first search field and transmitting a second request signal within a second, larger search field.

With additional reference to FIG. 2, and as will be described in more detail below, the onboard transmitter 18 can send first request signal 22a within a first search field 28 when the at least one actuating device (e.g., the first actuating device 14) is subjected to a first actuating operation for initiating a first vehicle operation or function. The onboard transmitter 18 can also send second request signal 22b within a second search field 30 when the at least one actuating device (e.g., the second actuating device 16) is subjected to a second actuating operation for initiating a second vehicle operation or function. As schematically shown, the first search field 28 can vary (e.g., in size, strength, etc.) relative to the second search field 30.

In one exemplary embodiment, the first actuating operation and the first vehicle function correspond to opening a closure (e.g., door, trunk, fuel door, tailgate or hatchback, etc.) of the vehicle and the second actuating operation and the second vehicle function correspond to closing the same closure. More particularly, for example, the first actuating operation can correspond to opening a closure and the first function or operation can include powered unlocking of this closure and/or powered opening of this closure. In this same example, the second actuating operation can correspond to closing the same closure and the second function or operation can include powered closing of the closure and/or powered locking of the closure.

The onboard transmitter 18 may include a single antenna 32 for transmitting the first and second request signals 22a, 22b. It is to be appreciated that the search signals 22a,22b (and thus the search fields 28,30) can radiate from the antenna 32 in all directions, though (and not shown) some directions may be stronger than others. Similarly, the onboard receiver 20 can include a single antenna 34 for receiving identification signals 24a,24b from the portable device 26. More particularly, power can be appropriately provided to the single antenna 32 at a first level for sending the first request signal 22a within the first search field 28 and at a second, higher level for sending the second request signal 22b within the second search field 30. It is to be appreciated that other embodiments of the present disclosure may employ different quantities of antennas.

The smart entry system 10 can further include a controller or control unit 36, which is operatively connected to the transmitter 18 and the receiver 20, and is configured to receive actuating signals 70,74 from the actuating devices 14,16. As will be described in more detail below, the controller 36 can command the onboard transmitter 18 to send the first signal 22a within the first search area 28 when the at least one actuating device (e.g., the first actuating device 14) is subjected to a first actuating operation. The controller 36 can also command operation of a first operation (e.g., powered unlocking and/or powered opening of a closure) corresponding to the first actuating device 14 when the onboard receiver 20 receives the identification signal 24a within a first prescribed period after transmission of the first search signal 22a. The controller 36 can also command the onboard transmitter 18 to send the second signal 22b within the second search area 30 when the at least one actuating device (e.g., second actuating device 16) is subjected to the second actuating operation. The controller 36 can also command operation of a second operation (e.g., powered closing and/or powered locking of a closure) corresponding to the second actuating device 16 when the onboard receiver 20 receives the identification signal 24b (e.g., a second identification signal) within a second prescribed period after transmission of the second search signal 22b.

As shown in FIG. 1, the portable device 26 (which can be a key fob, for example) can include a portable receiver 40 having an antenna 42 for receiving request signals, including first request signal 22a and second request signal 22b. The portable device 26 can also include a portable transmitter 44 having an antenna 46 for sending the identification signals 24a,24b back to the vehicle, and particularly to the onboard receiver 20. The portable device 26 can further include a controller or control unit 48 for coordinating communication and operations between the receiver 40 and the transmitter 44. For example, the control unit 48 can command the portable transmitter 44 to send identification signal 24a or 24b when the corresponding request signal 22a or 22b is received by the onboard receiver 40.

Figure 3:
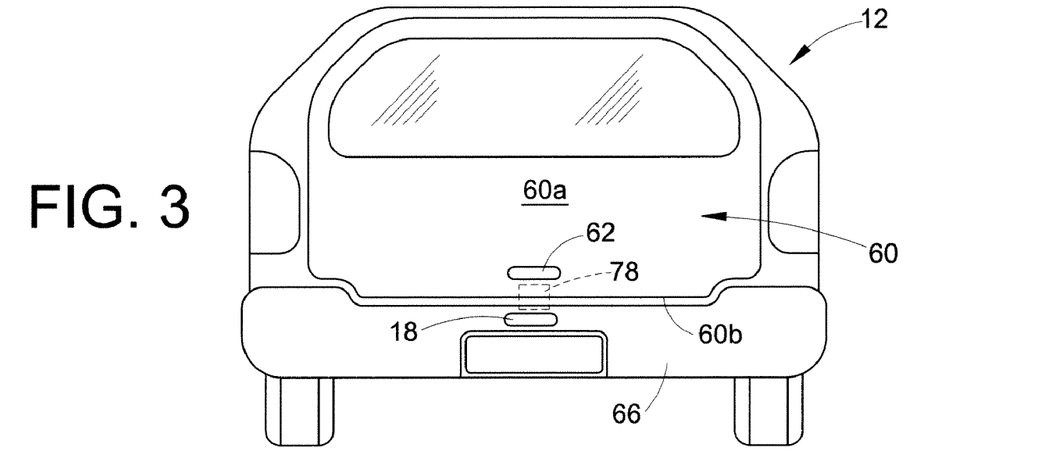
FIG. 3 is a rear elevational view of a vehicle having a tailgate (shown in a closed position) and equipped with a smart entry system for operating the tailgate.

With reference now to FIG. 3, an example deployment of the smart entry system 10 is illustrated in connection with a vehicle closure, such as tailgate 60, which can be a powered tailgate, for example. In this embodiment, the first actuating device 14 can be an unlock/open switch 62, which corresponds to a first vehicle function including powered unlocking and/or powered opening of the tailgate 60, and the second actuating device 16 can be a close/lock switch 64 (FIG. 6), which corresponds to a second vehicle function including powered closing and/or subsequent powered locking of the tailgate 60. The unlock/open switch 62 can be any actuating device which communicates a user's desire to unlock and open the tailgate 60 upon actuation of the device 62. For example, the device 62 could simply be a button or could be a door handle conventional in appearance that, when actuating (e.g., is pulled), communicates that a first actuating operation is occurring to the control unit 36. In the illustrated embodiment, the unlock/open switch 62 is shown positioned on an exterior side 60a of the tailgate 60 near a lower edge 60b thereof, however, it is to be appreciated that an exact configuration and/or position of the unlock/open switch 62 can vary. In the system 10, when employed in connection with the tailgate 60, the first actuating operation can be actuation of the unlock/open switch 62 to initiate the first vehicle function, which can be powered unlocking and/or powered opening of the tailgate 60.

The close/lock switch 64 can likewise be any actuating device which communicates a user's desire to close and lock the tailgate 60 upon actuation of the device 64. In the illustrated embodiment, with reference to FIG. 6, the close/lock switch 64 is shown as being disposed along or near the lower or distal edge 60b of the tailgate 60 and only accessible when the tailgate 60 is in its open position. By way of example, the close/lock switch 64 can be a button that, when actuated, communicates that a second actuating operation is occurring to the control unit 36. Like the unlock/open switch 62, it is to be appreciated that the close/lock switch can be configured as desired (i.e., it need not be a button) and its location need not be as illustrated. In the system 10, when employed in connection with the tailgate 60, the second actuating operation can be actuation of the close/lock switch 64 to initiate the second vehicle function, which can be powered closing and/or powered locking of the tailgate 60.

Though not illustrated, it is also to be appreciated that the unlock/open switch 62 and the close/lock switch 64 could alternatively be provided in a single mechanism or by a single button or switch. For example, a single button or switch could serve as an actuating device for at least two vehicle functions. In a tailgate application, actuation of the single button when the tailgate is closed could be used for or correspond to powered unlocking and/or opening of the tailgate (a first vehicle function) and actuation of the same single button when the tailgate is open could be used for or correspond to powered unlocking and/or powered closing of the tailgate. In alternate embodiments, any number of actuating devices could be provided for operation of any number of vehicle functions and each function (or group of functions) could have its own specific search field for searching for the portable device (e.g., device or fob 26).

Figure 4:
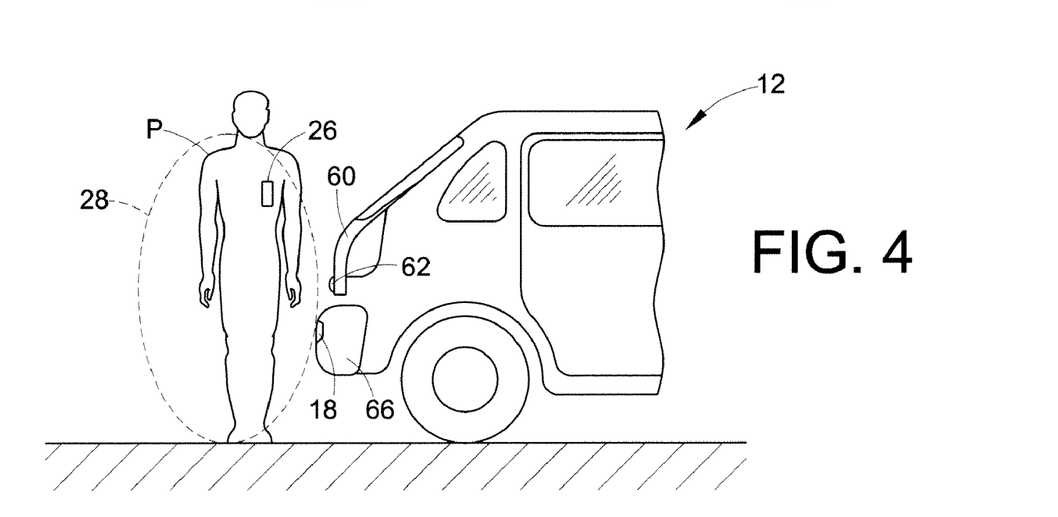
FIG. 4 is a partial side elevational view of the vehicle of FIG. 3 shown with the tailgate in the closed position and the smart entry system sending a first request signal within a first search field.
Figure 5:
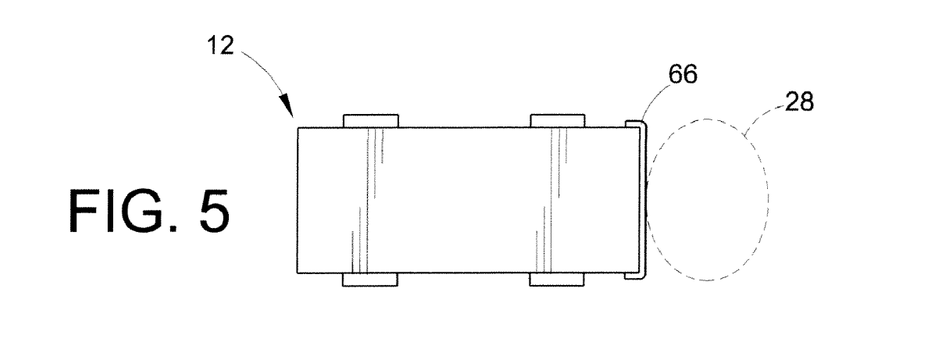
FIG. 5 is a schematic plan view of the vehicle and the first search field of FIG. 4
Figure 6:
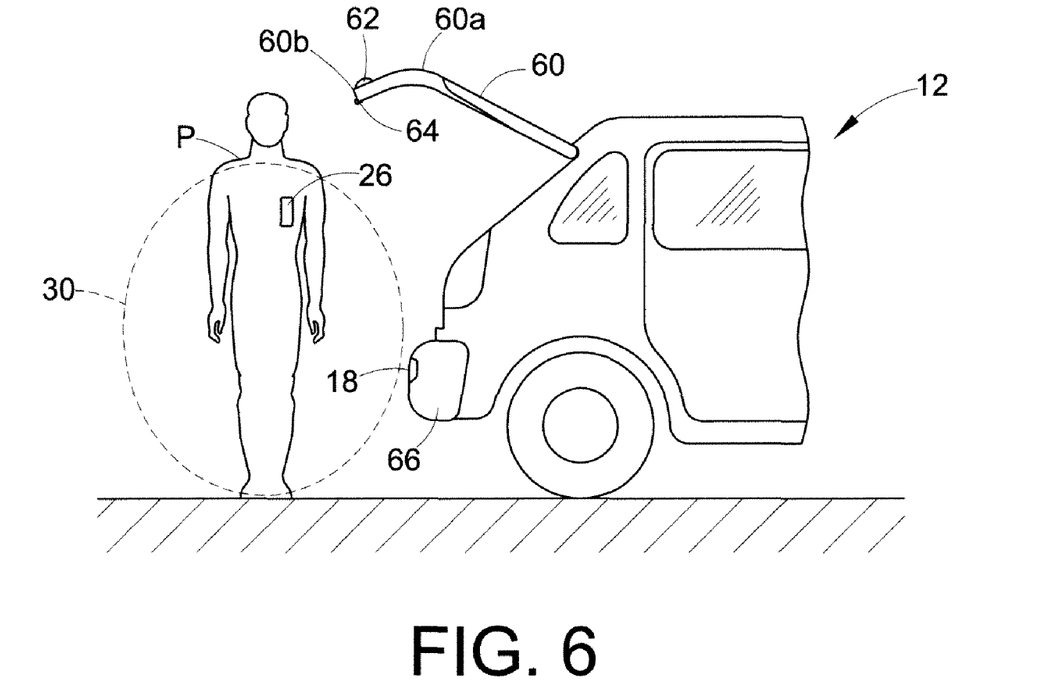
FIG. 6 is a partial side elevational view of the vehicle of FIG. 3 shown with the tailgate in an open position and the smart entry system sending a second request signal within a second, larger search field.
Figure 7:
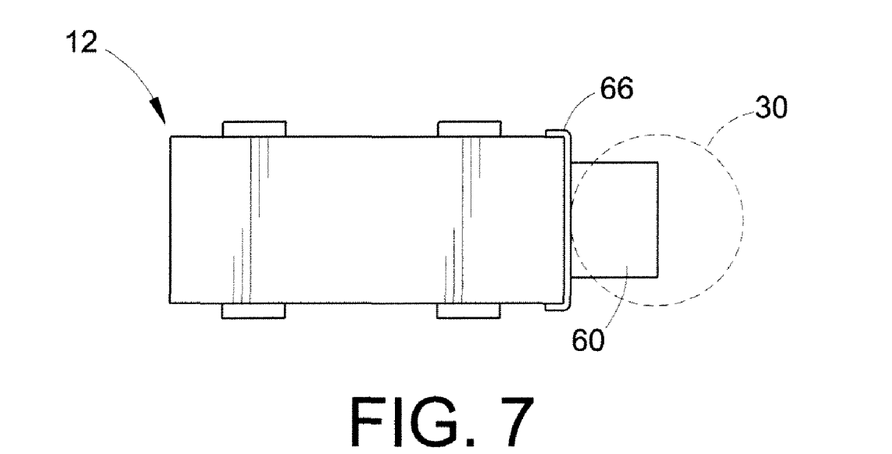
FIG. 7 is a schematic plan view of the vehicle and the second search field of FIG. 6.

As shown, the onboard transmitter 18, including its antenna 32, can be mounted to bumper 66 of the vehicle 12 disposed immediately below the tailgate 60, and particularly below the lower edge 60b of the tailgate. Accordingly, when used for the tailgate 60, both the first and second search fields 28,30 can be provided adjacent the tailgate 60. In particular, both the first and second search fields 28,30 can be disposed immediately adjacent the tailgate 60 and/or the bumper 66, but the second search field 30 can be larger than the first search field 28. More particularly, as best shown in FIGS. 5 and 7, the second search field 30 can extend a greater distance from the vehicle bumper 66 than the first search field 28. According to this configuration, a person P with the portable unit 26 must be relatively close to the vehicle bumper 66 and thus the vehicle 12 for the portable unit 26 to be disposed within the first search field 28 (as shown in FIG. 4). In contrast, when the tailgate 60 is in its open position of FIGS. 6 and 7, the person P with the portable device 26 can be farther away from the bumper 66 and the vehicle 12 when in the second search field 30 due to the increased size of the search field (as shown in FIG. 6). This accounts for the likelihood of the person P being spaced farther from the vehicle 12 when the tailgate 60 is open and the close/lock switch 64 is to be actuated as compared to the condition where the person P is attempting to unlock and open the closure 60 via the unlock/open switch 62. It will be understood that in alternative embodiments, the antenna 32 may be mounted in different locations on the vehicle 12.

Figure 8:
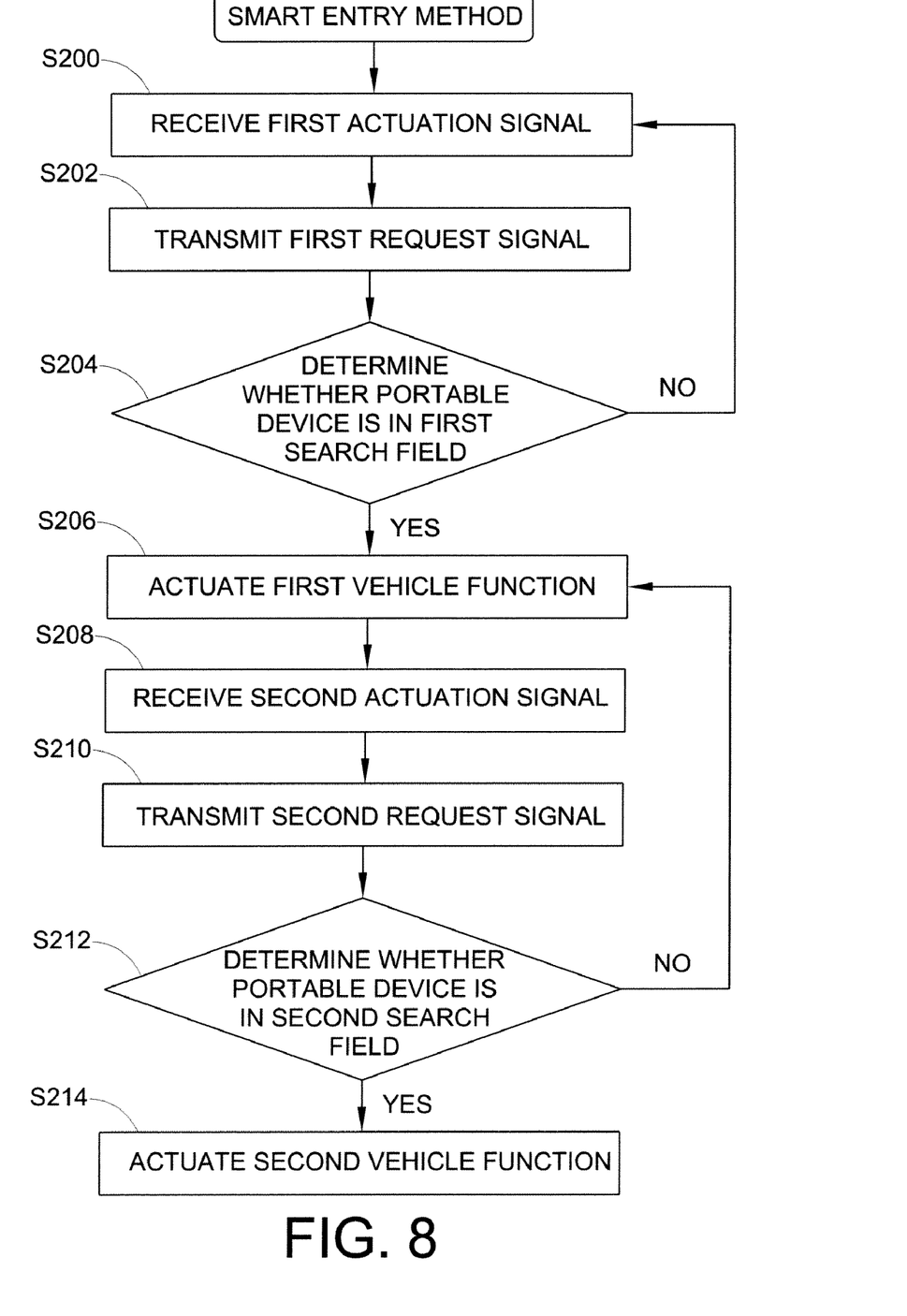
FIG. 8 is a flow diagram illustrating a smart entry method for a vehicle.

With additional reference to FIG. 8, an exemplary smart entry method will now be described. In particular, the smart entry system method of FIG. 6 will be described in reference to the smart entry system 10 of FIGS. 1 and 2. In step S200, after a first actuation operation occurs to generate first actuation signal 70, the first actuation signal 70 is received by the control unit 36 from at least one actuating device (e.g., the first actuating device 14) indicating that a first actuating operation is occurring. Upon receipt of the first actuation signal 70, the control unit 36 can command the onboard transmitter 18 to transmit or send the first request signal 22a within the first search field 28 in step S202.

Next, in step S204, it is determined whether the portable device 26 is within the first search field 28. Specifically, when the portable device 26 is within the first search field 28, the receiver 40 of the portable device 26 can receive the first search signal 22a and, upon receipt, the controller 48 of the portable device 26 instructs the portable transmitter 44 to transmit the ID signal 24a. The ID signal 24a can then be received by the onboard transmitter 20 from the portable device 26, which is located within the first search field 28. Receipt of ID signal 24a can be required within a first prescribed time after sending of the first request signal 22a in step S202, if desired. This confirms that the portable device 26 is in the first search field 28. When employed, the first prescribed time can be two seconds, for example. Should no ID signal (e.g., signal 24a) be received, such as within the prescribed period of time (e.g., when the portable device 26 is outside the field 28), the method terminates and again waits for receipt of the first actuation signal 70 in step S200. It will be understood that the prescribed time can be various different durations within the scope of the present disclosure.

After receiving the ID signal 24a within the first prescribed time in step S204, the control unit 36 can send a first vehicle function command signal 72 to actuate the first vehicle function (step S206). In particular, the signal 72 can be received by one or more controllers or devices 78, which commences operation of a specified first vehicle function upon receipt of said signal 72. Thus, sending of the first vehicle command signal 72 actuates a first vehicle function (e.g., powered unlocking a closure and/or powered opening of the closure). Accordingly, the first actuating operation results in actuation of the first vehicle function when the portable device 26 is within the first search field 28.

At some later time, after a second actuation operation occurs to generate second actuation signal 74, the second actuation signal 74 can be received by the control unit 36 from the at least one actuating device (e.g., the second actuating device 16) indicating that a second actuation operation is occurring (S208). Upon receipt of the second actuation signal 74, the control unit 36 can command the onboard transmitter 18 to transmit or send the second request signal 22b within the second search field 30, which can be a larger search field than the first search field 28 (S210).

In step S212, it is determined whether the portable device 26 is in the second search filed 30. Specifically, when the portable device 26 is within the second search field 30, the portable receiver 40 receives the second request signal 22b and, upon receipt, the controller 48 commands the portable transmitter 44 to send ID signal 24b. The ID signal 24b, which can be referred to as a second or another ID signal, is then received by the onboard receiver 20 from the portable device 26, which is located within the second search field 30. Receipt of the ID signal 24b can be required within a second prescribed time after the sending of the second request signal in step S210 to confirm that the portable device 26 is in the second search field 30, if desired. When employed, the second prescribed period of time can be two seconds, for example, or any other suitable period of time. Should no ID signal (e.g., signal 24b) be received, such as within the second prescribed period of time, the method returns to step S208 and waits for another second actuation signal 74.

When the second ID signal 24b is received within the second prescribed time, the control unit 36 can send a second vehicle function command signal 76 in step S212 to actuate the second vehicle function (S214). In particular, the signal 78 can be received by the one or more controllers or devices 78, which commences operation of a specified second vehicle function upon receipt of the signal 76. Thus, sending of the second vehicle command signal 76 actuates a second vehicle function (e.g., powered closing a closure and/or powered locking of the closure). Accordingly, the second actuating operation results in actuation of the second vehicle function when the portable device is within the second search field 30.

Figure 9:
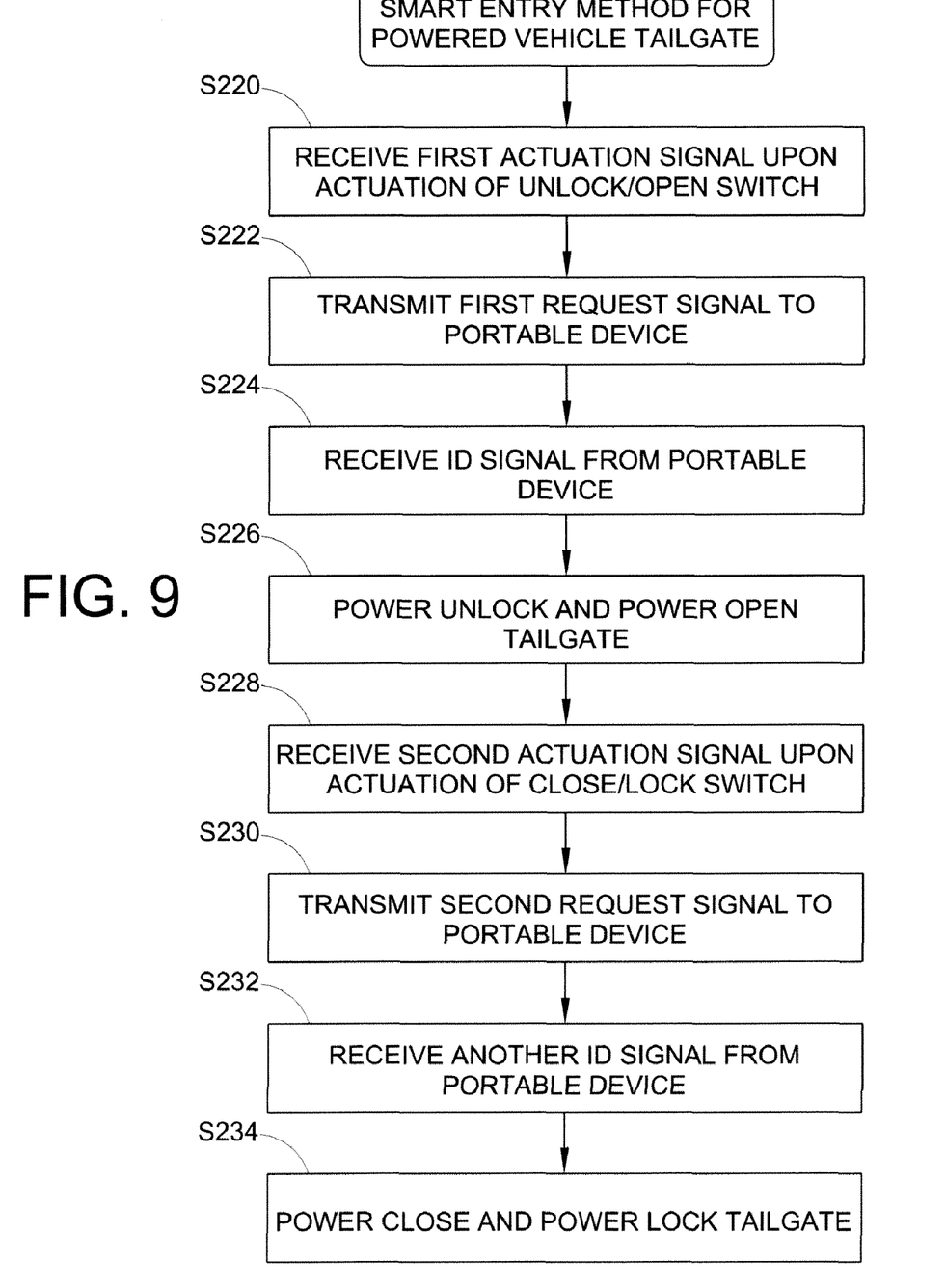
FIG. 9 is a flow diagram illustrating a smart entry method for a powered vehicle tailgate.

With reference now to FIG. 9, a smart entry method for a powered tailgate, such as tailgate 60 of FIGS. 2-7 will now be described. More particularly, in step S220 a first actuation signal, such as signal 70, is received upon actuation of the unlock/open switch 62, which can be the first actuating device 14. Next, in step S222 the first request signal 22a is transmitted or sent to the portable device 26. Sending the first request signal 22a in step S222 can include powering the antenna 32 to a first level for transmitting a low level frequency within the first search area 28.

Provided the portable device 26 is within the first search field 28, the portable receiver 40 receives the first request signal 22a and the controller 48 commands the portable transmitter 44 to transmit ID signal 24a, which can be an RF signal, for example. ID signal 24a is received by the onboard transmitter 20 from the portable device 26 in step S224. Upon receipt of the ID signal 24a by the onboard transmitter 20, the control unit 36 can send command signal 72 to power unlock the tailgate 60 and power open the tailgate 60 (S226). If desired, the ID signal 24a can be required within a first prescribed period. The first vehicle function command signal 72 could be a signal or signals that cause powered unlocking and powered opening of the tailgate 60. For example, the signal 72 could be one or more signals sent to one or more controllers or devices 78, such as a powered lock mechanism for unlocking the tailgate and a motor for powered opening of the tailgate.

At some later time, a second actuation signal 74 can be received by the control unit 36 upon actuation of the close/lock switch 64 in step S228. Upon receipt, the control unit 36 can command the onboard transmitter 18 to transmit or send the second request signal 22b to the portable device 26 in step S230. Sending the second request signal S230 can include powering the antenna 32 to a second, higher level relative to that used in transmitting the first request signal 22a for transmitting a low level frequency within the second, larger search area 30. Provided the portable device 26 is located within the second search area 30, the portable receiver 40 can receive the second request signal 22b.

Upon receipt, the controller 48 of the portable device 26 can command the portable transmitter 44 to transmit second ID signal 24b, which can be an RF signal for example. In step S232, this ID signal 24b is received from the portable device 26 by the onboard transmitter 20. Upon receipt of the second ID signal 24b by the onboard receiver 20, the control unit 36 can send the second vehicle function command signal 76 to power close the tailgate 60 and power lock the tailgate 60 (S234). If desired, the ID signal 24b can be required within a second prescribed time. Where the second vehicle function includes powered closing and powered locking of the tailgate 60, the second vehicle function command signal 76 can be one or more signals that cause powered closing of the tailgate 60 and powered locking of the tailgate 60. For example, the command signal 76 could be one or more signals to one or more controllers or devices 78, such as a motor of the tailgate 60 for powered closing of the tailgate 60 and a latching/locking device 78 for powered locking of the tailgate 60. As already indicated, the first search field 28 can extend from a rear end of the vehicle 12 to a first distance spaced apart from the rear end and the second search field 30 can extend from the rear end of the vehicle 12 to a second, greater distance spaced apart from the rear end.

Though the system 10 illustrated in FIG. 1 shows a first actuating device 14 and a second actuating device 16, it is to be appreciated that the system 10 can use any number of actuating devices for coordinating operation of any number of vehicle functions. For example, a single actuating device could be used for initiating two or more vehicle functions. Applied to the tailgate 60 of FIGS. 3-7, such an arrangement could employ a single actuating device for communicating a user's desire to unlock/open the tailgate 60 when the tailgate 60 is in its closed position and also to lock and close the tailgate 60 when the tailgate is in its open position. It is also to be appreciated that the system 10 can be used with other types of vehicle functions and with other vehicle closures (e.g., a passenger compartment door, a fuel cap access door, a trunk, etc.). Other vehicle functions could include, for example, glass hatch operation, power window/sunroof activation, engine compartment access, etc. Also for example, the system 10 could be employed for only powered unlocking and powered locking of a vehicle closure or only for powered opening and powered closing of a vehicle closure (i.e., it need not do both powered unlocking/locking and powered opening/closing).

In any case, it is to be appreciated that in connection with the particular exemplary embodiments presented herein certain structural and/or function features are described as being incorporated in defined elements and/or components. However, it is contemplated that these features may, to the same or similar benefit, also likewise be incorporated in common elements and/or components, or separated, where appropriate. For example, the control unit 36 could be distributed throughout the system 10. It is also to be appreciated that different aspects of the exemplary embodiments may be selectively employed as appropriate to achieve other alternative embodiments suited for desired applications, the other alternate embodiments thereby realizing the respective advantages of the aspects incorporated herein. It is also to be appreciated that particular elements or components described herein may have their functionality suitably implemented via hardware, software, firmware, or in combination thereof. Additionally, it is to be appreciated that certain elements described herein as incorporated together may under suitable circumstances be stand-alone elements or otherwise divided. Similarly, a plurality of particular functions described as being carried out by one particularly element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

It will be appreciated that various of the above-disclosed and other features and functions, or alternative thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A smart entry system for a vehicle, comprising:
   at least one actuating device for operation of at least two vehicle functions;
   an onboard transmitter for sending request signals to a portable device, said onboard transmitter sending a first request signal within a first search field when said at least one actuating device is subjected to a first actuating operation for initiating a first vehicle function and sending a second request signal within a second search field when said at least one actuating device is subjected to a second actuating operation for initiating a second vehicle function, said first search field varying relative to said second search field wherein said first actuating operation and said first vehicle function correspond to powered opening of a closure of said vehicle and said second actuating operation and said second vehicle function corresponding to powered closing of said closure; and
   an onboard receiver for receiving an identification signal from said portable device.

2. The smart entry system of claim 1 wherein said first and second search fields are adjacent said closure, said second search field larger than said first search field.

3. The smart entry system of claim 2 wherein said at least one actuating device is an unlock/open switch and a close/ lock switch, said first actuating operation is actuating said unlock/open switch to initiate said first vehicle function and said second actuating operation is actuating said close/lock switch to initiate said second vehicle function, said first vehicle function is unlocking and opening said closure and said second vehicle function is closing and locking said closure.

4. The smart entry system of claim 3 wherein said closure is a powered tailgate and said unlock/open switch corresponds to powered unlocking and opening of said powered tailgate and said close/lock switch corresponds to powered closing and subsequent locking of said powered tailgate.

5. The smart entry system of claim 4 wherein said onboard transmitter is mounted in a bumper of said vehicle disposed below said powered tailgate.

6. The smart entry system of claim 5 wherein said transmitter includes a single antenna for transmitting said first and second request signals, power to said single antenna provided at a first level for sending said first request signal within said first search field and provided at a second, higher level for sending said second request signal within said second search field.

7. The smart entry system of claim 4 wherein said close/unlock switch is positioned near a distal edge of said tailgate.

8. The smart entry system of claim 1 further including said portable device, which includes:
   a portable receiver for receiving said request signals, including said first request signal and said second request signal; and
   a portable transmitter for sending said identification signal.

9. The smart entry system of claim 1 further including:
   a controller commanding said onboard transmitter to send said first signal within said first search area when said at least one actuating device is subjected to said first actuating operation and commanding operation of a first operation when said onboard receiver receives said identification signal within a first prescribed period after transmission of said first search signal, said controller commanding said onboard transmitter to send said second signal within said second search area when said at least one actuating device is subjected to said second actuating operation and commanding operation of a second operation when said onboard receiver receives said identification signal within a second prescribed period after transmission of said second search signal.

10. The smart entry system of claim 9 wherein said first actuating operation corresponds to opening a closure and said first operation includes powered unlocking of said closure and powered opening of said closure, and wherein said second actuating operation corresponds to closing said closure and said second operation includes powered closing of said closure and powered locking of said closure.

11. A smart entry method for a vehicle, comprising:
   sending a first request signal within a first search field when a first actuating operation occurs;
   receiving an identification signal within a first prescribed time after sending said first request signal from a portable device located within said first search field;
   actuating a first vehicle function upon receipt of said identification signal within said first prescribed time, wherein the first vehicle function includes powered opening of vehicle closure;
   sending a second request signal within a second, larger search field when a second actuating operation occurs;
   receiving a second identification signal from said portable device located within said second search field within a second prescribed time after sending said second request signal; and
   actuating a second vehicle function upon receipt of said second identification signal within said second prescribed time, wherein the second vehicle function includes powered closing of a vehicle closure.

12. The smart entry method of claim 11 wherein said first vehicle function includes powered unlocking and powered opening of a vehicle closure and said second vehicle function includes powered closing and powered locking of said vehicle closure.

13. A smart entry method for a vehicle, comprising:
   sending a first request signal within a first search field when a first actuating operation occurs;
   receiving an identification signal within a first prescribed time after sending said first request signal from a portable device located within said first search field;
   actuating a first vehicle function upon receipt of said identification signal within said first prescribed times
   sending a second request signal within a second, larger search field when a second actuating operation occurs;
   receiving a second identification signal from said portable device located within said second search field within a second prescribed time after sending said second request signal; and
   actuating a second vehicle function upon receipt of said second identification signal within said second prescribed time,
   wherein sending said first request signal includes powering an antenna to a first level for transmitting a low level frequency within said first search area, and wherein sending said second request signal includes powering said antenna to a second, higher level for transmitting a low level frequency within said second, larger search area.

14. The smart entry method of claim 13 wherein said first vehicle function includes powered unlocking and powered opening of a vehicle tailgate and said second vehicle function includes powered closing and powered locking of said vehicle tailgate, and wherein said antenna is disposed on a vehicle body below a lower edge of said vehicle tailgate when in a closed position.

15. The smart entry method of claim 11 wherein said first actuating operation includes actuating an unlock/open switch on a vehicle closure, and wherein said second actuating operation includes actuating a close/lock switch on said vehicle closure.

16. The smart entry method of claim 11 wherein receiving said first and second identification signals includes receiving RF communications from a portable device.

17. The smart entry method for a vehicle, comprising;
   receiving a first actuation signal indicating that a first actuating operation is occurring;
   transmitting a first request signal within a first search field upon receipt of said first actuation signal;
   determining whether a portable device is located within said first search field by receiving an identification signal from said portable device located within said first search field within a first prescribed time after sending said first request signal;
   sending a first vehicle function command signal after receiving said identification signal within said first prescribed time;
   receiving a second actuation signal indicating that a second actuation operation is occurring;

transmitting a second request signal within a second search field upon receipt of said second actuation signal;

determining whether said portable device is located within said second search field by receiving another identification signal from said portable device located within said second search field within a second prescribed time after sending said second request signal; and sending a second vehicle function command signal after receiving said another identification signal within said second prescribed time, wherein said first vehicle function includes powered unlocking and powered opening of a vehicle tailgate and said second vehicle function includes powered closing and powered locking of said vehicle tailgate.

18. The smart entry method of claim 17 wherein said first search field extends from a rear end of said vehicle to a first distance spaced apart from said rear end and said second search field extends from said rear end of said vehicle to a second, greater distance spaced apart from said rear end.

19. A smart entry system for a vehicle, comprising:

at least one actuating device for operation of at least two vehicle functions;

an onboard transmitter for sending request signals to a portable device, said onboard transmitter sending a first request signal within a first search field when said at least one actuating device is subjected to a first actuating operation for initiating a first vehicle function and sending a second request signal within a second search field when said at least one actuating device is subjected to a second actuating operation for initiating a second vehicle function, said first search field varying relative to said second search field; and an onboard receiver for receiving an identification signal from said portable device, wherein said transmitter includes a single antenna for transmitting said first and second request signals, power to said single antenna provided at a first level for sending said first request signal within said first search field and provided at a second, higher level for sending said second request signal within said second search field.

* * * * *